US012571428B2

(12) United States Patent
Jiang et al.

(10) Patent No.: US 12,571,428 B2
(45) Date of Patent: Mar. 10, 2026

(54) CAGE AND BALL BEARING COMPRISING THE CAGE

(71) Applicant: Aktiebolaget SKF, Gothenburg (SE)

(72) Inventors: Gaojie Jiang, Shanghai City (CN); Keqiang Cao, Shanghai (CN); Meng Zhang, Shanghai (CN); He Zhu, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 160 days.

(21) Appl. No.: 18/457,718

(22) Filed: Aug. 29, 2023

(65) Prior Publication Data

US 2024/0077112 A1     Mar. 7, 2024

(30) Foreign Application Priority Data

Sep. 7, 2022    (CN) .......................... 202211088225.8

(51) Int. Cl.
*F16C 33/38*          (2006.01)

(52) U.S. Cl.
CPC ...... *F16C 33/3875* (2013.01); *F16C 2226/74* (2013.01)

(58) Field of Classification Search
CPC .............. F16C 33/3862; F16C 33/3868; F16C 33/3875; F16C 2226/74
See application file for complete search history.

(56) References Cited

U.S. PATENT DOCUMENTS

| | | | |
|---|---|---|---|
| 1,045,193 A | * | 11/1912 | Sachs .................. F16C 33/3862 |
| | | | 384/530 |
| 2,861,849 A | | 11/1958 | Case |
| 4,568,206 A | | 2/1986 | Imazaike |
| 4,902,145 A | | 2/1990 | Johnson |
| 7,703,986 B2 | | 4/2010 | Naito |
| 9,022,662 B2 | | 5/2015 | Ito |

(Continued)

FOREIGN PATENT DOCUMENTS

| | | | | |
|---|---|---|---|---|
| AT | 226018 B | | 2/1963 | |
| JP | 2004360823 A | * | 12/2004 | .......... F16C 33/3862 |

(Continued)

OTHER PUBLICATIONS

Machine Translation of WO-2011098357-A1 (Year: 2011).*

(Continued)

*Primary Examiner* — Alan B Waits
(74) *Attorney, Agent, or Firm* — Stinson LLP

(57) ABSTRACT

A cage includes a first sub-part having a plurality of first partitions integrated as a whole and a plurality of first pocket portions formed by adjacent first partitions. A first engaging portion is formed on at least one of the first partitions. A second sub-part includes a plurality of second partitions integrated as a whole and a plurality of second pocket portions formed by adjacent second partitions. A second engaging portion is formed on at least one of the second partitions. A pocket is formed by the first pocket portion and its corresponding second pocket portion. Each first engaging portion snaps with its corresponding second engaging portion. The cage overcomes the harmful umbrella effect found in a one-piece polymer prong-type cage, so that the bearing equipped with this cage can operate under very high speeds. The cage can be part of a ball bearing.

17 Claims, 6 Drawing Sheets

(56)                References Cited

U.S. PATENT DOCUMENTS

2013/0156360 A1*   6/2013   Uozumi ............. F16C 33/7893
                                                    384/523
2017/0292567 A1*  10/2017   Taniguchi ........... F16C 33/3875
2023/0193954 A1*   6/2023   Bai ........................ F16C 19/06
                                                    384/530

FOREIGN PATENT DOCUMENTS

JP            2013092242  A  *   5/2013    .......... F16C 33/3875
JP            2014020468  A  *   2/2014    .......... F16C 33/3875
WO      WO-2011098357  A1  *   8/2011    .......... F16C 33/3875
WO            2013099586  A1      7/2013

OTHER PUBLICATIONS

Machine Translation of JP-2013092242-A (Year: 2013).*
Machine Translation of JP-2014020468-A (Year: 2014).*
Machine Translation of JP-2004360823-A (Year: 2004).*

* cited by examiner

CAGE AND BALL BEARING COMPRISING THE CAGE

CROSS-REFERENCE TO RELATED APPLICATION

This application claims priority to Chinese Application No. 202211088225.8, filed Sep. 7, 2022, the entirety of which is hereby incorporated by reference.

FIELD

The present disclosure relates to a cage and a ball bearing comprising the cage.

BACKGROUND

Ball bearings, especially deep groove ball bearings, are widely used in various fields. A traditional cage for a deep groove ball bearing includes, for example, a steel cages with a wave profile requiring riveting connection, a one-piece polymer prong-type cage, and so on. A window type cage is difficult to be applied to a deep groove ball bearing due to the assembling process of such cage. However, the steel cage is heavy, requires a complicated assembling process (involving riveting connection) and not suitable for high-speed applications. While the one-piece polymer prong-type cage has a semi-enclosed structure, which is lighter in weight and simple in assembling, but it is not suitable for high-speed applications either. For example, in some bearing applications that require high operation speeds, the cages will suffer from an umbrella effect.

Taking the deep groove ball bearing as an example, please refer to FIGS. 1 and 9. As the speed is increasing, prongs of the one-piece polymer prong-type cage (also known as one-way insert cage) tend to expand and deform outward under centrifugal force, causing the so-called "umbrella effect". The umbrella effect will destroy the matching relationship between the pockets and the balls, causing interference between the pockets and the balls, thus leading to local overheating of the cage. What's more, severe umbrella effect under high speeds will cause the balls dropping-off from the cage, and the bearing will be stuck, which will lead to failure of related systems.

In addition, the prongs of the one-piece polymer prong-type cage allow large deformation so as to meet the needs of assembling process. However, such deformation operation on the cage is usually considered as risky, since it may cause the prongs of the cage to break.

SUMMARY

In view of this, the present disclosure provides a cage comprising: a first sub-part comprising a plurality of first partitions integrated as a whole and a plurality of first pocket portions formed by adjacent first partitions, wherein a first engaging portion is formed on at least one of the first partitions; a second sub-part comprising a plurality of second partitions integrated as a whole and a plurality of second pocket portions formed by adjacent second partitions, wherein a second engaging portion is formed on at least one of the second partitions, and a pocket is formed by the first pocket portion and its corresponding second pocket portion; wherein each first engaging portion snaps with its corresponding second engaging portion.

The cage overcomes the harmful umbrella effect found in the one-piece polymer prong-type cage, so that the bearing equipped with this cage can operate under very high speeds. Moreover, since the structural stiffness of the cage of the present disclosure is higher, the stress at critical locations is lower, and due to its fully enclosed pocket design, it can deal with very harsh bearing working environment and bearing working requirements in comparison with the prong-type cage.

DETAILED DESCRIPTION

Figure 1:
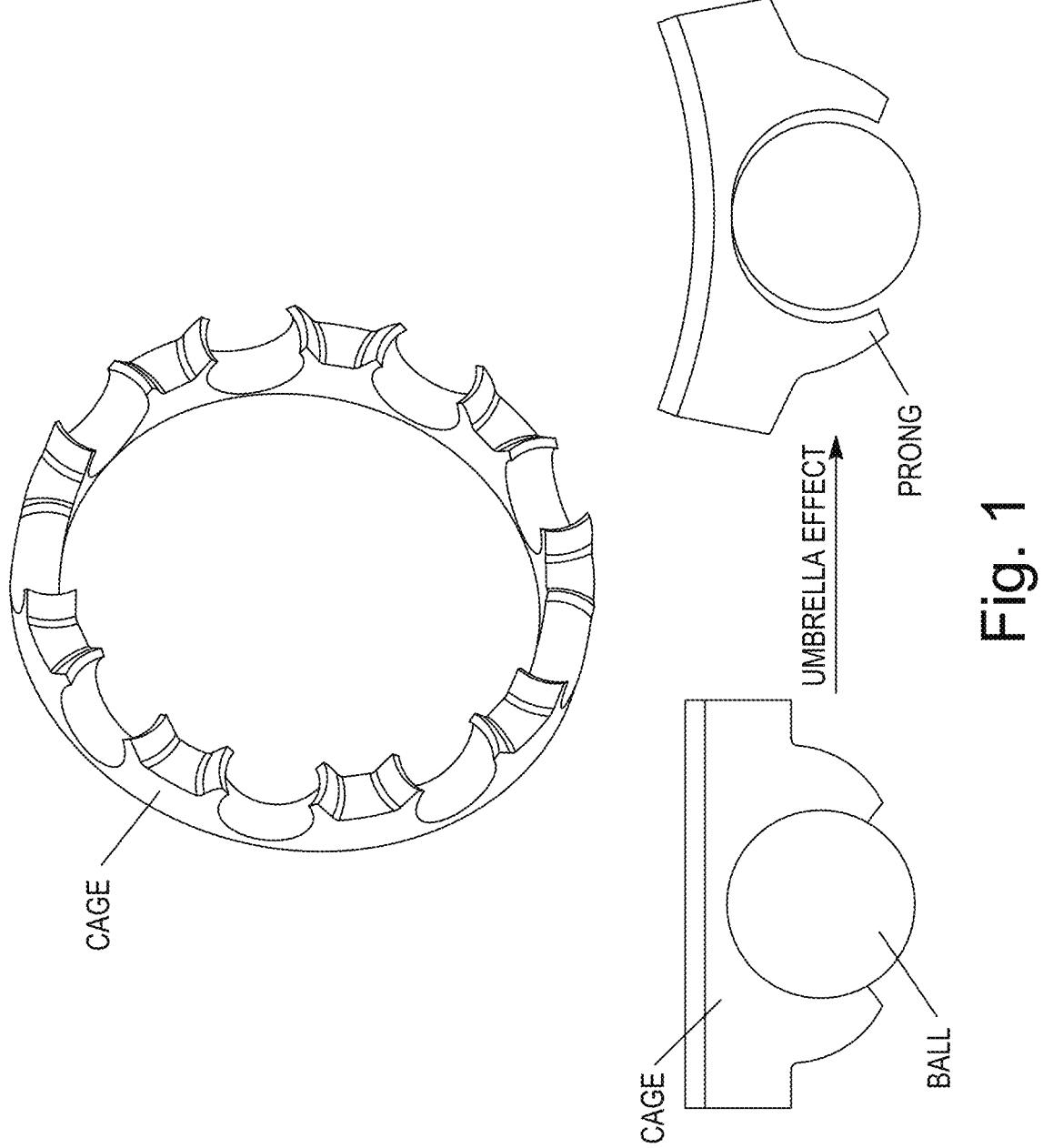
FIG. 1 is a schematic view of a prior art cage and its umbrella effect.

In order to make the purpose, technical solution and advantages of the technical solution of the present disclosure clearer, the technical solution of the embodiment of the present disclosure will be described clearly and completely in the following with the attached drawings of specific embodiments of the present disclosure. Like reference numerals in the drawings represent like components. It should be noted that a described embodiment is a part of the embodiments of the present disclosure, not the whole embodiments. Based on the described embodiments of the present disclosure, all other embodiments obtained by those skilled in the field without creative labor fall into the scope of protection of the present disclosure.

In comparison with the embodiments shown in the attached drawings, feasible embodiments within the protection scope of the present disclosure may have fewer components, other components not shown in the attached drawings, different components, components arranged differently or components connected differently, etc. Furthermore, two or more components in the drawings may be implemented in a single component, or a single component shown in the drawings may be implemented as a plurality of separate components.

Unless otherwise defined, technical terms or scientific terms used herein shall have their ordinary meanings as understood by those skilled in the field to which this disclosure belongs. For example, similar words such as "including" or "comprising" mean that the elements or objects appearing before the word cover the elements or objects listed after the word and their equivalents, without excluding other elements or objects. "Up", "down", "left" and "right" are only used to indicate the relative orientation relationship when the equipment is used or the orientation relationship shown in the attached drawings. When the absolute position of the described object changes, the relative orientation relationship may also change accordingly.

For the convenience of explanation, the direction of the rotation axis of the bearing to which the cage is applied is called an axial direction, the direction perpendicular to the axial direction is called a radial direction, and the direction along the rotation direction of the bearing is called the circumferential direction. The term "inner/inward" refers to the direction toward the inside of the relevant component, whereas the term "outer/outward" refers to the direction toward the outside of the relevant component.

Figure 2:
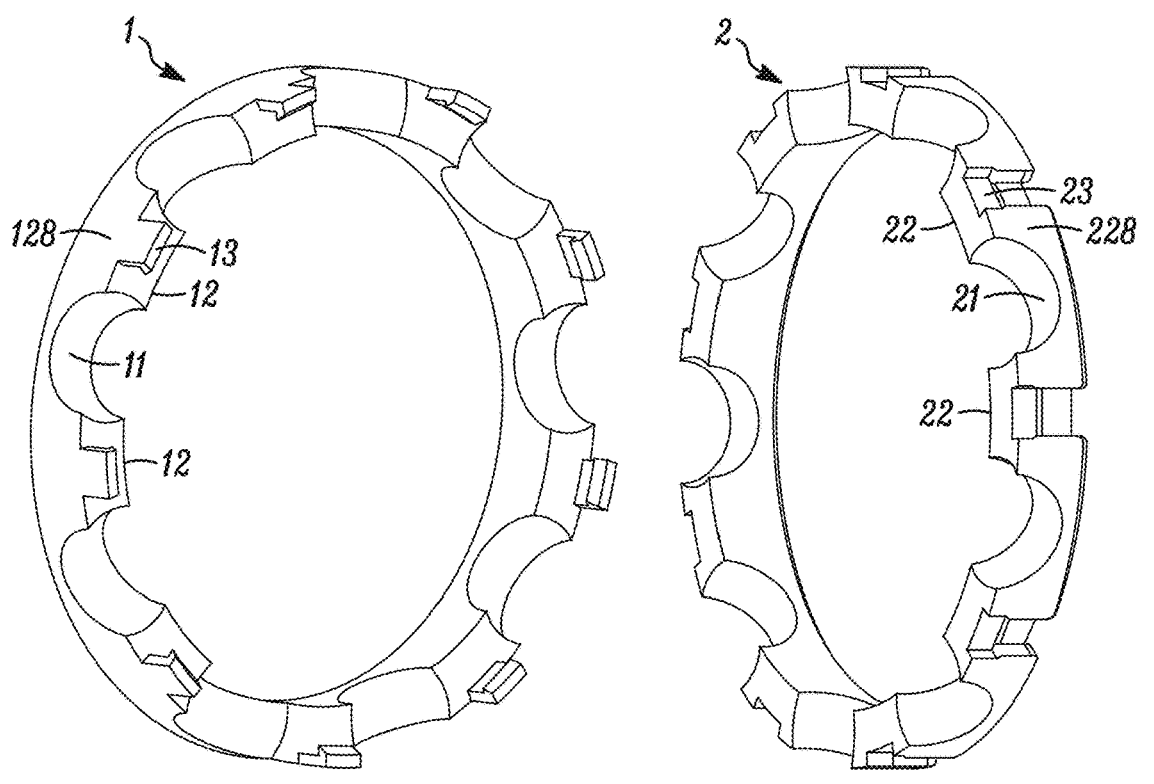
FIG. 2 is a schematic view of a cage according to a preferred embodiment of the present disclosure.
Figure 3:
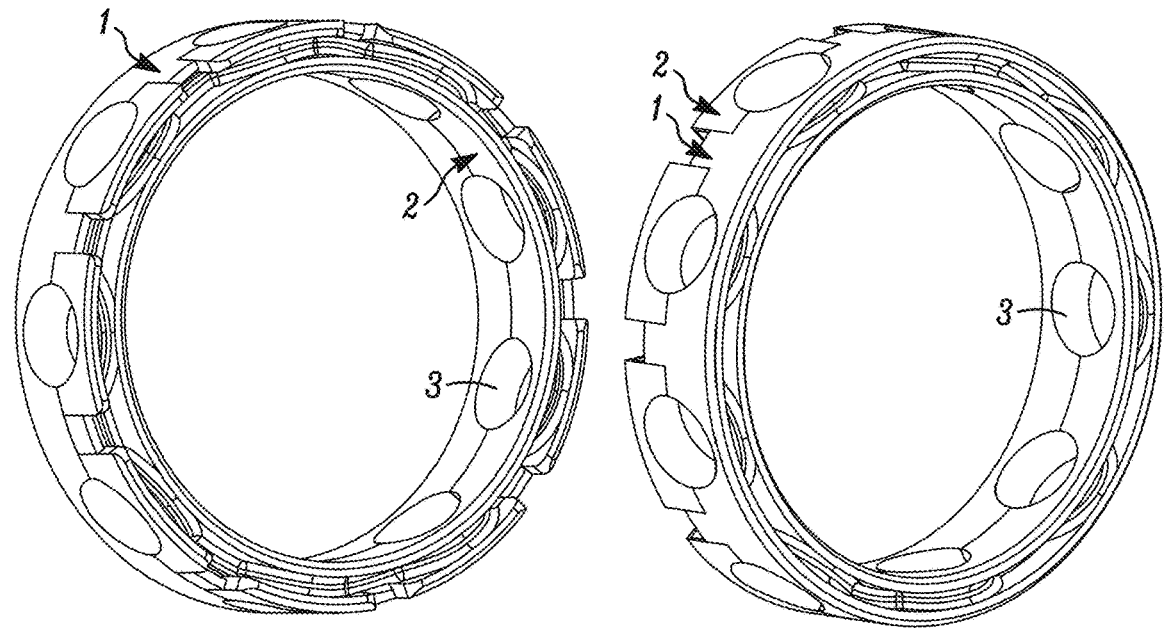
FIG. 3 is a front perspective view and a rear perspective view of an assembled cage of a preferred embodiment.

Referring to the preferred embodiment of FIGS. 2-3, the present disclosure provides a cage comprising a first sub-part 1 and a second sub-part 2 which are assembled oppositely along an axial direction and snapped together. In this embodiment, the cage is suitable for deep groove ball bearings.

The first sub-part 1 comprises a plurality of first partitions 12 integrated as a whole and a plurality of first pocket portions 11 formed by adjacent first partitions 12, wherein a first engaging portions is formed on at least one of the first partitions 12. Accordingly, the second sub-part 2 comprises a plurality of second partitions 22 integrated as a whole and a plurality of second pocket portions 21 formed by adjacent second partitions 22, wherein a second engaging portion is formed on at least one of the second partitions 22. A pocket 3 is formed by the first pocket portion 11 and its corresponding second pocket portion 21, as shown in FIG. 3, and the pocket is used to hold a ball. Further, each first engaging portion 13 snaps its corresponding second engaging portion 23, to fix the first sub-part 1 and the second sub-part 2 together.

It should be understood that the meaning of "at least one of" above means that, although in the embodiment shown in FIGS. 2-3, each first partition 12 and each second partition 22 is formed with a corresponding engaging portion, in other embodiments not shown, corresponding engaging portions may be provided on any of the first partitions and any of the second partitions according to the number of first partitions and second partitions and the assembling requirements of the cage. For example, every second partition is provided with an engaging portion, or every third partition is provided with an engaging portion, etc., but generally the number of engaging portions on each sub-part should be greater than or equal to two.

When the cage is used for assembling a bearing, one can firstly put the balls into the pockets of one of the sub-parts, and then assemble the other sub-part to the sub-part containing the balls. The two sub-parts can be fixed together through the snap-fit between the corresponding engaging portions, to form a cage fully enclosing the balls.

In comparison with the one-piece polymer prong-type cage of the prior art, the cage of the present disclosure eliminates the pocket openings and prongs, and realizes a full enclosure of the balls. Especially during the operation of the deep groove ball bearing, the deformation of the cage of the present disclosure is smaller, the umbrella effect can be effectively avoided, and the cage can be prevented from popping out when the bearing rotates at high speeds. Therefore, extremely high rotary speeds of the deep groove ball bearing can be realized. Moreover, this cage can also reduce stress and strain on edges, thus reducing fracture of the edges. In addition, when the bearing is in operation, the cage can guide the balls better and absorb more vibration.

On the other hand, although the material selection for the first and second sub-parts is not particularly limited, it is preferable that, in this embodiment and other preferred embodiments described later, the first sub-part 1 and second sub-part 2 are made of polymer materials, such as nylon, PA66, PA6, PEEK, etc. In comparison with the steel cage of the prior art which needs to be fixed by riveting, the cage made of polymer is lighter in weight and has better shock-absorption effect, so it is also beneficial to the application with higher rotary speeds.

It should be understood that shape of the first engaging portion and shape of the second engaging portion are not particularly limited (some specific shapes are given in the preferred embodiment below), as long as the first sub-part 1 and the second sub-part 2 can be firmly snapped together.

In the preferred embodiment shown in FIGS. 2-3, the first engaging portion includes a claw 13 extending along the axial direction from a radial outer side 128 of the first partition 12, and the second engaging portion includes a slot 23 recessed in a radial direction from a radial outer side 228 of the second partition 22. The length of the claw 13 and the depth of the slot 23 can be appropriately set according to the actual needs.

According to the inventor's research, the cage may usually subject to a radial outward force when the bearing is in operation, which leads to the tendency of radial outward deformation and displacement, which is very unfavorable for the conventional one-piece polymer prong-type cage. Therefore, according to the present disclosure, the claws and the slots are arranged at the radial outer sides of the corresponding partitions, so that the radial outward force can be effectively resisted, and the cage can hold the balls more firmly, which is more suitable for the bearing operating under high-speeds. Of course, when the bearing speed is not high and the stress requirement of the cage is not high, the claws and the slots can also be formed on the radial inner sides of the corresponding partitions.

Figure 4:
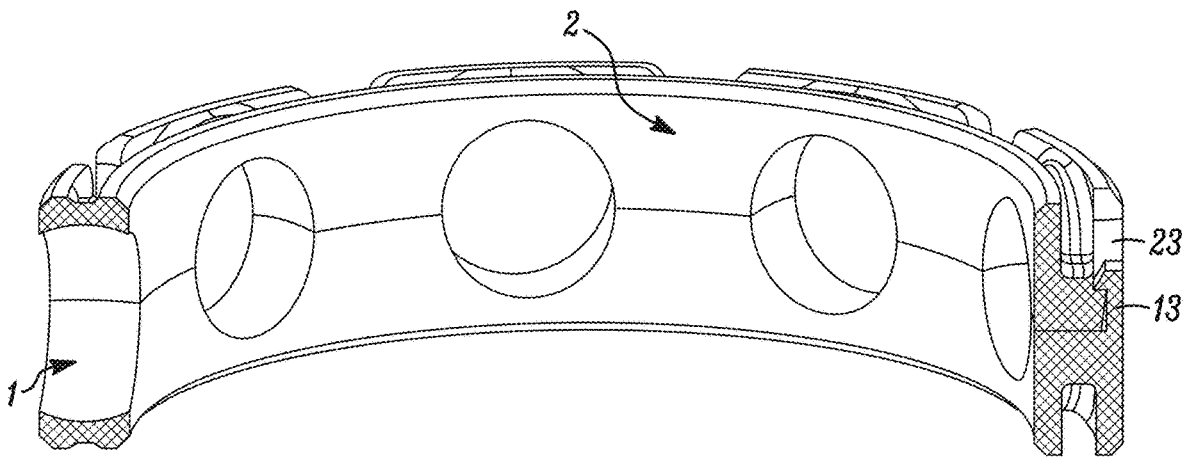
FIGS. 4-5 are sectional perspective views and partial enlarged views of the assembled cage of a preferred embodiment.

In addition, the present disclosure also provides an optimized design for the structure of the claws and the slots. FIG. 4 shows a sectional view of the cage assembled after snap-fit, and FIG. 5 is a partial enlarged view.

Figure 5:
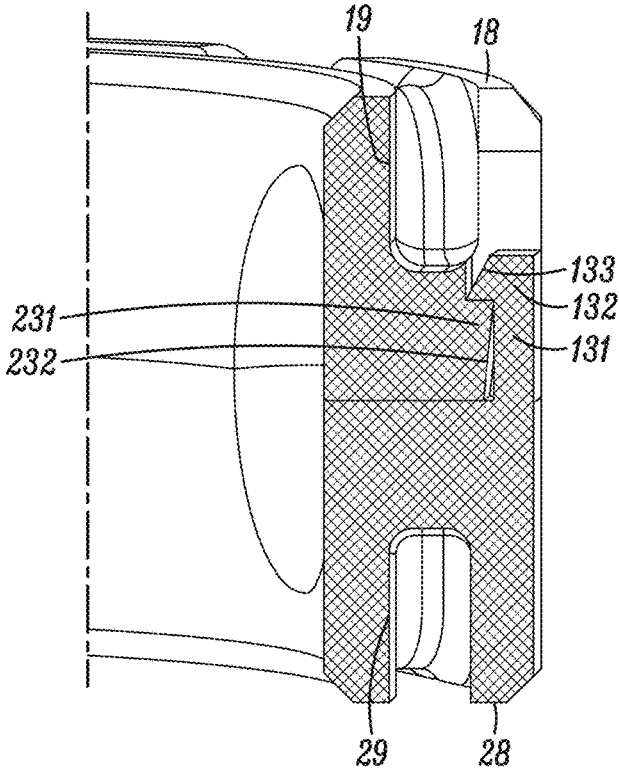

As shown in FIG. 5, each claw 13 may include an arm portion 131 and a hook portion 132 at the end of the arm portion, and accordingly, each slot 23 comprises a boss 231 for engaging with the hook portion 132.

In addition, the hook portion 132 includes an inclined surface 133 inclined relative to the axial direction, and the boss 231 may be designed to include a guide surface 232 inclined relative to the axial direction. The guide surface 232 can guide the inclined surface 133 when assembling the first sub-part 1 and the second sub-part 2. This can not only reduce the deformation of the arm portion 131 of the claw 13, but also make the assembling operation of the first sub-part 1 and the second sub-part 2 smoother.

Preferably, an axial outer side 18 of the first sub-part 1 may include a groove 19, and/or an axial outer side 28 of the second sub-part 2 may include a groove 29. Such grooves 19, 29 form material removal portions, which can further reduce the total weight of the cage. In addition, the depth of the grooves can be designed as needed. For example, in the preferred embodiment shown in FIG. 5, the depth of the groove 19 on the axial outer side 18 of the first sub-part 1 is designed not to reach the boss 231.

In addition, in the embodiment shown in FIGS. 2-3, all the claws 13 are arranged on the first sub-part 1, and all the slots 23 are arranged on the second sub-part 2. In comparison with this embodiment, the present disclosure also presents that claws and slots can be arbitrarily arranged on the first sub-part 1 and the second sub-part 2. For example, in another preferred embodiment of the present disclosure shown in FIG. 6A, a structure is provided, in which the claws and the slots are alternately arranged on the first sub-part 1 and the second sub-part 2, respectively. For convenience of display, in FIG. 6A, the claws and slots are not specifically shown, but the locations where the claws and slots are formed are marked by solid circles and hollow circles.

Figure 6A:
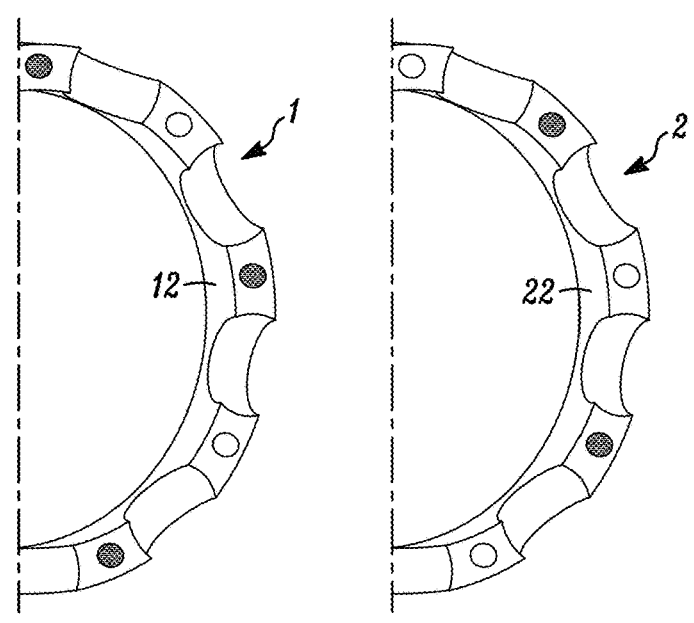
FIGS. 6A and 6B are each a schematic view of a cage according to other preferred embodiments of the present disclosure.

Specifically, as shown in FIG. 6A, a first claw and a first slot may be alternately formed on all the first partitions 12. The first claw may extend along the axial direction from the radial outer side of the corresponding first partition 12 marked with a hollow circle, and the first slot may be recessed in the radial direction from a radial outer side of the corresponding first partition 12 marked with a solid circle.

Accordingly, a second claw and a second slot may be alternately formed on all the second partitions 22. The second claw may extend along the axial direction from a radial outer side of the corresponding second partition 22 marked with a hollow circle, and a second slot may be recessed in the radial direction from a radial outer side of the corresponding second partition 22 marked with a solid circle.

Therefore, the first claw of the first sub-part 1 snaps with its corresponding second claw of the second sub-part 2, and the first claw of the first sub-part 1 snaps with its corresponding second claw of the second sub-part 2.

With this configuration, structures of the first sub-part 1 and the second sub-part 2 may also be identical, that is, the two sub-parts of the cage can be produced by only one mold, which further saves the manufacturing cost and the assembling cost.

It should be further understood that the first claw, the second claw, the first slot and the second slot in this preferred embodiment may adopt the claw structure and the slot structure as described above with reference to FIGS. 4-5, and the details will not be not repeated here.

Figure 6B:
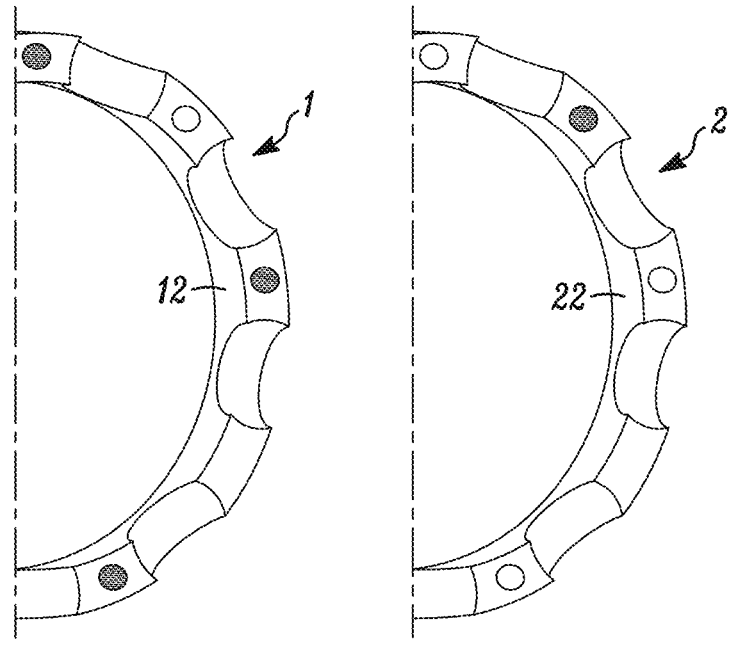

Although in the embodiment of FIG. 6A, the slots or the claws are formed as engaging portions on each of the partitions of two sub-parts 1 and 2, the present disclosure is not limited to this embodiment. The claws or the slots may be formed as engaging portions on some optional partitions (see FIG. 6B). Specifically, in other embodiments not shown, at least one of the first engaging portions (for example, 2-3 engaging portions) comprises a first claw and at least another one of the first engaging portions (for example, 2-3 engaging portions) comprises a first slot, and accordingly, at least one of the second engaging portions comprises a second claw and at least another one of the second engaging portions comprises a second slot as long as the first claw can snap with its corresponding second slot, and the first slot can snap with its corresponding second claw. Moreover, according to an optimized arrangement, the first sub-part 1 and the second sub-part 2 may also be designed with the same structure, and the two sub-parts of the cage can be produced by one mold.

It should also be understood that the positional relationship between the claw and the slot on each sub-part can also be flexibly arranged, for example, each first claw is adjacent to at least one first slot and each second claw is adjacent to at least one second slot. According to a preferred embodiment not shown, adjacent partitions spaced approximately 120° apart along the circumferential direction on each sub-part may be selected to form a pair of claw and slot, that is, each sub-part includes three pairs of claws and slots.

Figure 7:
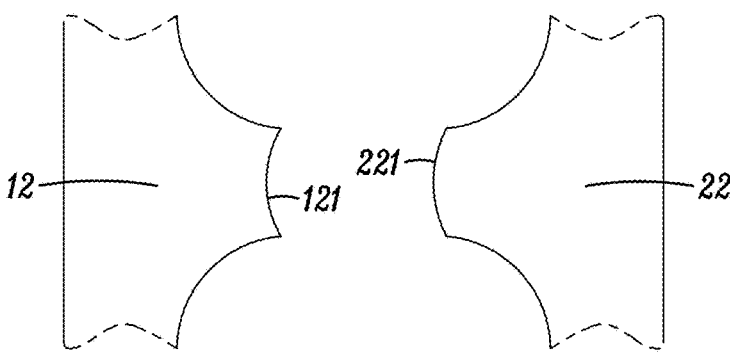
FIGS. 7-8 are schematic views of preferred embodiments for axially inner sides of the first and second sub-parts.
Figure 8:
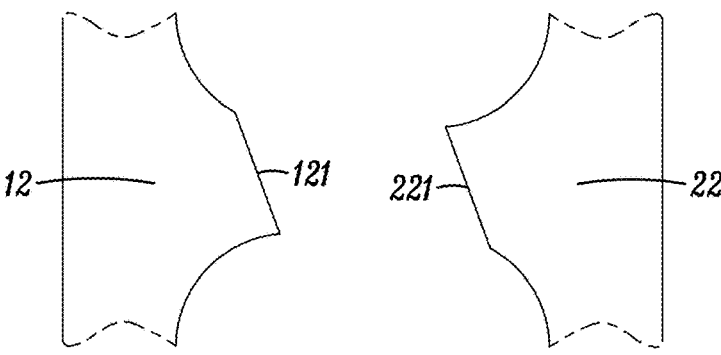

In addition, in the above-mentioned embodiments, the axial inner side of the first partition 12 is formed as a flat surface perpendicular to the axial direction, and the axial inner side of the second partition 22 is formed as a flat surface perpendicular to the axial direction, so that the abutting surfaces between the first partition 12 and the second partition 22 are flat surfaces. Furthermore, the present disclosure also provides a modification to the axial sides abutting each other between the first sub-part 1 and the second sub-part 2, as shown in FIGS. 7 and 8. For convenience, display of the first engaging portion and the second engaging portion is omitted from FIGS. 7 and 8.

Specifically, in the modification of FIG. 7, an axial inner side 121 of the first partition 12 is formed as a curved surface, and an axial inner side 221 of the second partition 22 is formed as a curved surface matching with the axial inner side 121. The two curved surfaces may preferably be surfaces in arc shape, or they may have any other curved shape, such as in a shape of wave. By arranging the abutting surfaces in the form of curved surfaces, it can further facilitate the first sub-part 1 and the second sub-part 2 to hold each other and prevent them from being dislocated and deformed along the circumferential direction. In addition, it should be understood that even if such curved surfaces are provided, it will not affect the formation of the first engaging portions and the second engaging portions.

According to another modification, as shown in FIG. 8, an axial inner side 121 of the first partition 12 is formed as an inclined surface inclined relative to the axial direction, and an axial inner side 221 of the second partition 22 is formed as an inclined surface inclined relative to the axial direction and matching with the axial inner side 121. By arranging the abutting surfaces in the form of inclined surfaces, it can further facilitate the first sub-part 1 and the second sub-part 2 to hold each other and prevent them from being dislocated and deformed along the circumferential direction. In addition, it should be understood that even if such inclined surfaces are provided, they will not affect the formation of the first engaging portions and the second engaging portions.

This non-planar axial sides design may also be used in combination with the embodiments of the present disclosure described above.

In addition, the present disclosure also provides some other improvements and deformations of the cage, and these improvements and deformations may also be used in combination with the above-mentioned embodiments.

According to one aspect of the present disclosure, an axial width ratio of the first partition 12 of the first sub-part 1 to the second partition 22 of the second sub-part 2 is 1:2 to 2:1.

According to this design, for example, when the axial width of the first partition 12 and the second partition 22 is 1:1 and a design of alternate claw and slot as described in FIG. 6A is adopted, the first sub-part 1 and the second sub-part 2 can be completely the same, which is beneficial to reducing the cost for processing and manufacturing, and the assembling process is simple. However, due to this structure, the maximum circumferential diameter of the ball is located at the interfacing seam of the axial inner sides between the first sub-part and the second sub-part, which sometimes causes the balls to be dislocated (this dislocation often occurs in steel cages of the prior art that need riveting). When the axial width ratio of the first partition 12 and the second partition 22 is 1:2 or 2:1, the pocket portion of one of the sub-parts 1 or 2 will be relatively larger, so that the portion of the ball with the largest circumferential diameter can be enclosed by one sub-part, which prevents the ball from being dislocated.

Although the cage according to the present disclosure is described above by taking a deep groove ball bearing as an example, it should be understood that the concept of the present disclosure can also be applied to cages for other type rolling elements.

Moreover, the inventors of the present disclosure further studies and compares the performance of a prior art cage with one-piece polymer prongs and a fully-enclosed cage after snap-fit according to the present disclosure (which includes the aforementioned groove) through simulation experiments. By inputting the correct simulation conditions, an actual working condition can be simulated very closely, which can accurately reflect the relevant performance of different cages under the actual working condition.

Specifically, the inventor compares the deformation of the prior art cage and that of the cage according to the present disclosure under different rotary speeds through simulation experiments, as shown in the following table.

The simulation experiments adopt a plug-in cage of the prior art and the cage of the present disclosure, with a diameter of about 28 mm, made of PA66-GF25, and calculated by using the elastic modulus of 2,000 MPa.

The loading condition is to apply centrifugal forces corresponding to different rotary speeds to the cages in a free status, and calculate the deformation of the cages under centrifugal force. The deformation of the prior art cage is compared with that of the cage of the present disclosure.

| Rotary Speed (RPM) | Prior Art Cage (mm) | Cage of the Present Disclosure (mm) |
| --- | --- | --- |
| 1000 | 0.001~0.003 | 0.0001~0.0003 |
| 10000 | 0.15~0.20 | 0.005~0.01 |
| 20000 | 0.5~1 | 0.02~0.05 |
| 50000 | 2~4 | 0.1~0.3 |

It can be seen that the prior art cage has undergone great deformation under high rotary speeds above 10,000 RPM, and the cage faces the risk of flying off, so it cannot be competent for the bearing working condition with high rotary speeds. However, the deformation of the cage of the present disclosure is obviously smaller, and a normal operation of the bearing can be well ensured even under high rotary speed of 20,000 RPM.

Figure 9A:
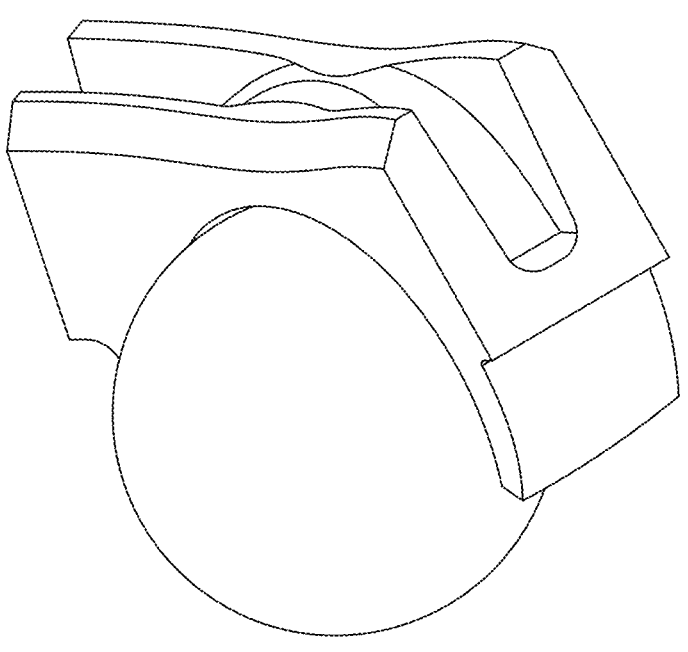
FIGS. 9A-B are a comparison between the simulation results of a prior art cage (FIG. 9A) and the cage (FIG. 9B) according to the present disclosure.
Figure 9B:
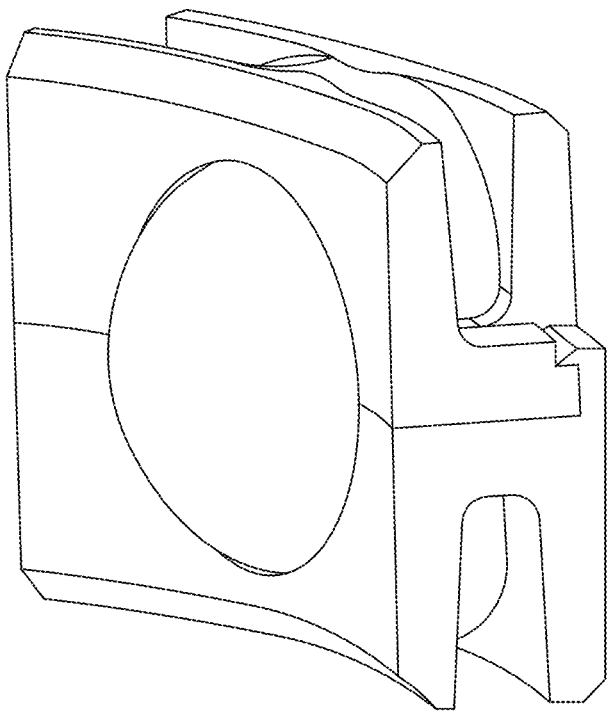

As further shown in FIGS. 9A-B, the inventor also studies the stress and strain of the prior art cage and that of the cage of the present disclosure through the above simulation experiments. Through comparison of the experiments, it can be seen that, under high rotary speeds, the prior art cage (FIG. 9A) has undergone great circumferential and radial deformation, that is, a serious umbrella effect has occurred. However, the cage (FIG. 9B) of the present disclosure hardly deforms, effectively holding the balls, can adapt to very severe high-temperature and high-speed working conditions, and has excellent stability.

Exemplary embodiments of the present disclosure have been described in detail above with reference to preferred embodiments, but those skilled can understand that various modifications and changes can be made to the above specific embodiments without departing from the concept of the present disclosure.

What is claimed is:

1. A cage comprising:
a first sub-part comprising a plurality of first partitions integrated as a whole and a plurality of first pocket portions formed by adjacent first partitions, wherein a first engaging portion is formed on at least one of the first partitions, one first partition of the plurality of first partitions having a first axial width; and
a second sub-part comprising a plurality of second partitions integrated as a whole and a plurality of second pocket portions formed by adjacent second partitions, wherein a second engaging portion is formed on at least one of the second partitions, and a pocket is formed by the first pocket portion and its corresponding second pocket portion, one second partition of the plurality of second partitions having a second axial width, the first axial width being greater than the second axial width;
wherein each first engaging portion snaps with its corresponding second engaging portion;
wherein the plurality of first pocket portions includes a primary first pocket portion and a secondary first pocket portion disposed on opposite sides of said one first partition, wherein the plurality of second pocket portions includes a primary second pocket portion and a secondary second pocket portion disposed on opposite sides of said one second partition, wherein:
an axial inner side of said one first partition is formed as a first curved surface extending circumferentially from the primary first pocket portion to the secondary first pocket portion, and an axial inner side of said one second partition is formed as a second curved surface matching with the first curved surface, the second curved surface extending circumferentially from the primary second pocket portion to the secondary second pocket portion; or
an axial inner side of said one first partition is formed as a first inclined surface inclined relative to the axial direction, the first inclined surface extending circumferentially from the primary first pocket portion to the secondary first pocket portion, and an axial inner side of said one second partition is formed as a second inclined surface inclined relative to the axial direction and matching with the first inclined surface, the second inclined surface extending circumferentially from the primary second pocket portion to the secondary second pocket portion.

2. The cage according to claim 1, wherein the first engaging portion includes a claw extending along an axial direction from a radial outer side of the first partition, and the second engaging portion includes a slot recessed in a radial direction from a radial outer side of the second partition.

3. The cage according to claim 2, wherein each claw comprises an arm portion and a hook portion at an end of the arm portion, and each slot comprises a boss for engaging with the hook portion.

4. The holder according to claim 3, wherein the hook portion includes an inclined surface inclined relative to the axial direction, and the boss includes a guide surface inclined relative to the axial direction for guiding the inclined surface when assembling the first sub-part and the second sub-part.

5. The cage according to claim 1, wherein:
at least one of the first engaging portions comprises a first claw and at least another one of the first engaging portions comprises a first slot, wherein the first claw extends along an axial direction from a radial outer side of the corresponding first partition, and the first slot is recessed in a radial direction from radial outer side of the corresponding first partition;
at least one of the second engaging portions comprises a second claw and at least another one of the second engaging portions comprises a second slot, wherein the second claw extends along the axial direction from the radial outer side of the corresponding second partition, and the second slot is recessed in the radial direction from the radial outer side of the corresponding second partition; and the first claw snaps with its corresponding second slot, and the first slot snaps with its corresponding second claws.

6. The cage according to claim 5, wherein each first claw is adjacent to at least one first slot and each second claw is adjacent to at least one second slot.

7. The cage according to claim 6, wherein each claw comprises an arm portion and a hook portion at an end of the arm portion, and each slot comprises a boss for engaging with the hook portion.

8. The holder according to claim 7, wherein the hook portion includes an inclined surface inclined relative to the axial direction, and the boss includes a guide surface inclined relative to the axial direction for guiding the inclined surface when assembling the first sub-part and the second sub-part.

9. The cage according to claim 8, wherein an axial width ratio of the first axial width of said one first partition to the second axial width of said one second partition is up to 2:1.

10. A ball bearing comprising the cage according to claim 9.

11. The cage according to claim 1, wherein an axial inner side of the first partition is formed as a flat surface perpen-dicular to the axial direction, and an axial inner side of the second partition is formed as a flat surface perpendicular to the axial direction.

12. The cage according to claim 1, wherein an axial width ratio of the first axial width of said one first partition to the second axial width of said one second partition is greater than 1:1 and up to 2:1.

13. A ball bearing comprising the cage according to claim 1.

14. The cage according to claim 1, wherein each first partition has the first axial width and each second partition has the second axial width.

15. The cage according to claim 1, wherein an axial outer side of at least one of the first sub-part or the second sub-part includes a groove.

16. The cage according to claim 15, wherein the axial outer side of the first sub-part includes the groove and the axial outer side of the second sub-part includes the groove.

17. The cage according to claim 1, wherein one of the plurality of first partitions does not have the first engaging portion formed thereon and one of the plurality of second partitions does not have the second engaging portion formed thereon.

* * * * *